Dec. 2, 1952            L. FASULO            2,620,055

EMERGENCY DIFFERENTIAL DEVICE FOR MOTOR VEHICLES

Filed July 20, 1948            3 Sheets-Sheet 1

INVENTOR.
LOUIS FASULO
BY
ATTORNEY

Dec. 2, 1952 L. FASULO 2,620,055
EMERGENCY DIFFERENTIAL DEVICE FOR MOTOR VEHICLES
Filed July 20, 1948 3 Sheets-Sheet 2
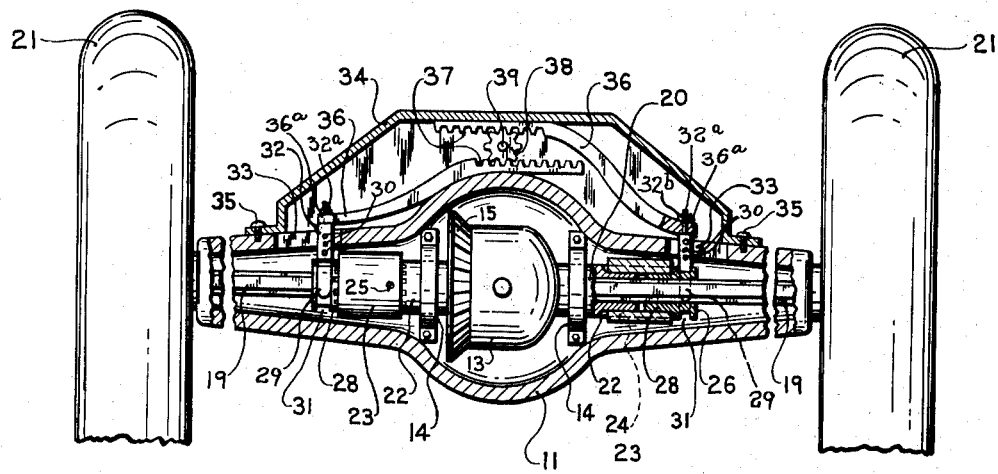
Fig. 3.
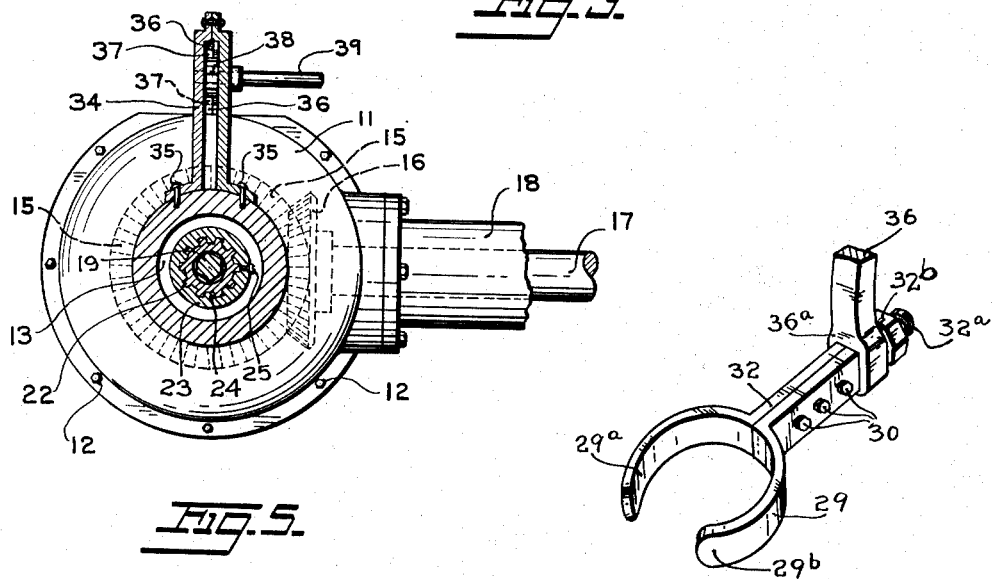
Fig. 5.
Fig. 6.
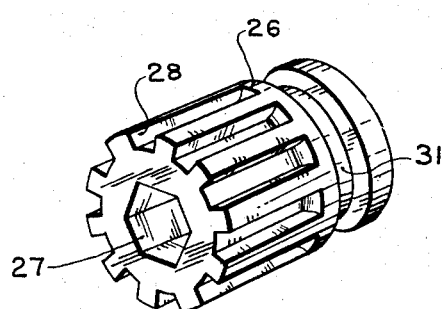
Fig. 7.
INVENTOR.
LOUIS FASULO
BY
ATTORNEY Dec. 2, 1952          L. FASULO          2,620,055
EMERGENCY DIFFERENTIAL DEVICE FOR MOTOR VEHICLES
Filed July 20, 1948          3 Sheets-Sheet 3
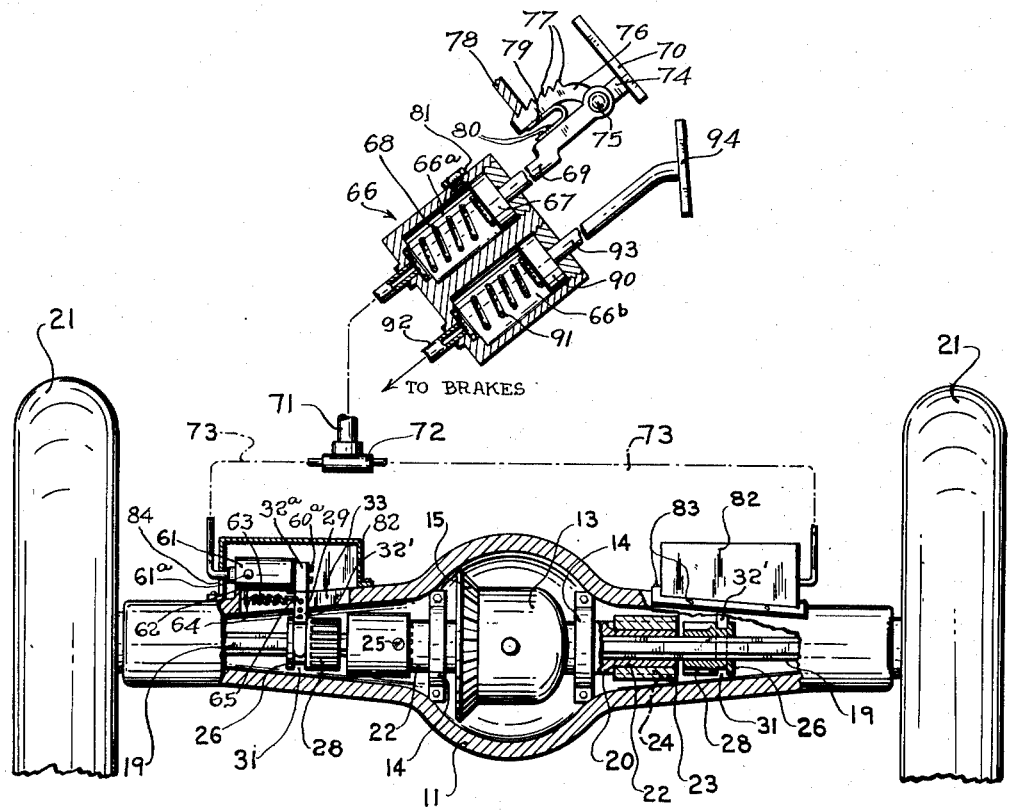
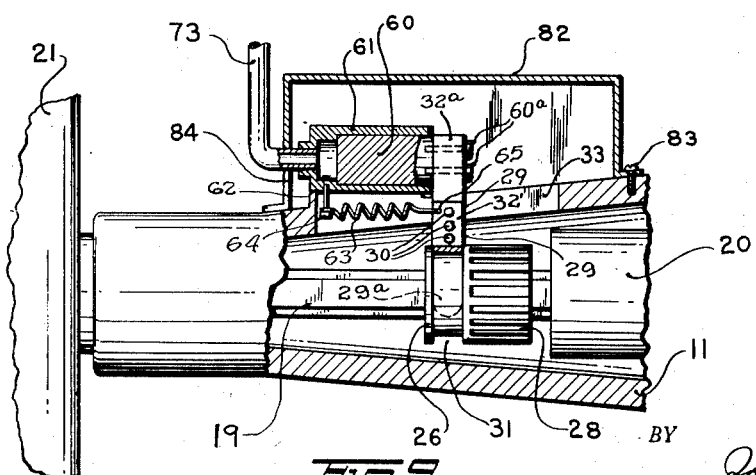
INVENTOR.
LOUIS FASULO
BY
*Jolton H. Holochek*
ATTORNEY Patented Dec. 2, 1952

2,620,055

UNITED STATES PATENT OFFICE 2,620,055

EMERGENCY DIFFERENTIAL DEVICE FOR MOTOR VEHICLES

Louis Fasulo, Brooklyn, N. Y.

Application July 20, 1948, Serial No. 39,724

2 Claims. (Cl. 192—87)

This invention relates to new and useful improvements in the differential of a motor vehicle.

In the present day differentials for the driven wheels of motor vehicles, each of the driven wheels is mounted on a separate axle section, and the axle sections are extended into the differential housing and have connection with the usual differential gears leaving the axle sections free for independent rotation when the vehicle is going around a corner. While such arrangement of the axle sections is necessary to permit the motor vehicle to go around corners, it also leaves the driven wheels useless for driving the vehicle in the event one of the driven wheels becomes stuck in the mud or snow or in a hole or is otherwise relieved of its driving load leaving that one wheel free to spin rendering the other driven wheel useless for driving purposes.

It is the purpose of the present invention to overcome the above objections to present day differentials by providing a novel mechanism for locking the axle sections to the differential housing in the event one of the wheels becomes stuck in the mud or snow or in a hole in a manner to prevent the one wheel from spinning so that normal traction of the other wheel may be used for driving the vehicle forwardly and so lift the one wheel out of its stuck position.

Still further, the present invention proposes forming the differential housing with tubular projections on opposite sides thereof and from which the axle sections extend with tubular sockets mounted on the tubular projections and means on the axle sections selectively engageable with the tubular sockets in a manner to lock the axle sections to the differential housing when so desired.

Another object of the present invention proposes providing the axle sections with normally non-rotative but axially slidable toothed clutch members engageable with complementary clutch teeth formed within the tubular sockets in a manner operatively to connect the clutch members and tubular sockets when the clutch members are moved axially on the axle sections to be engaged within the open ends of the sockets.

Still another object of the present invention proposes providing a rotative connection with the clutch members so as not to interfere with normal rotation of the clutch members with the axle sections and means for moving the forks in a manner to engage and disengage the clutch members with relation to the tubular sockets.

A further object of the present invention proposes the provision of hand controlled mechanical means connected with the forks and terminating in a manually turnable knob positioned on the dash board of the motor vehicle adjacent the driver's seat to be turned in a manner to move the forks to engage and disengage the clutch members.

Another object of the present invention proposes the provision of hydraulic controls terminating in a foot pedal adjacent the driver's seat of the motor vehicle in a manner to be depressed to operate the hydraulic controls to move the forks to engage and disengage the clutch members.

Still further, the present invention proposes the provision of a releasable means for holding the foot pedal in a depressed position in a manner to hold the clutch members in an engaged position with the tubular sockets.

Still further it is proposed to so arrange the differential that in the event the hand or foot brake or both brakes become inoperative, the axially slidable clutch members may be engaged with the tubular sockets in a manner to provide an effective brake for the motor vehicle.

Another object of the improved differential is to so construct the same that it will in no way interfere with normal operation of the wheels of the vehicle when driven in either a forward or reverse direction.

It is a further object of the present invention to construct an improved differential for a motor vehicle which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a view similar to Fig. 2, but illustrating a different position of the parts.

Fig. 5 is an enlarged transverse vertical sectional view taken on the line 5—5 of Fig. 2.

Fig. 6 is a perspective view of one of the forks per se.

Fig. 7 is a perspective view of one of the clutch members per se.

Fig. 8 is a view similar to Fig. 2, but illustrating a different modification of the present invention.

Fig. 9 is an enlarged sectional detailed view of a portion of Fig. 8.

Figure 1:
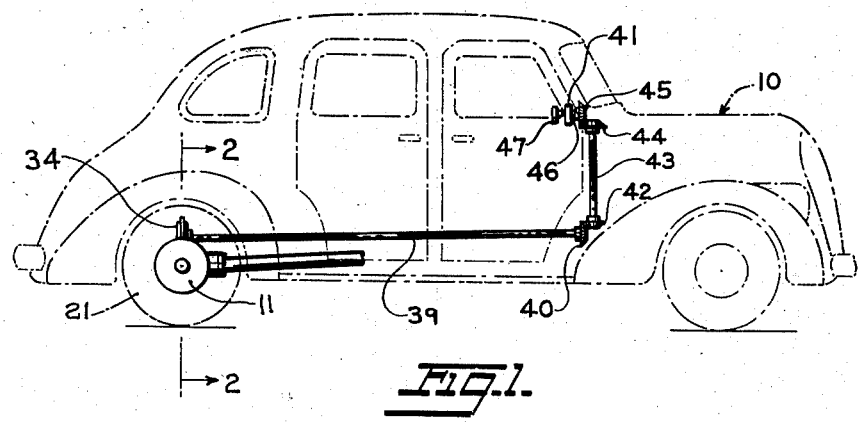
Fig. 1 is a diagrammatic showing of an automobile provided with an improved differential constructed in accordance with the present invention.

The improved differential, according to the form of the invention shown in Figs. 1 to 7, is shown applied to an automobile outlined in dot and dash lines 10 in Fig. 1. The automobile includes the usual tubular rear axle 11 formed of separate sections welded together. At the center, within the tubular rear axle 11 there is the usual differential housing 13 enclosing the usual planetary gearing, not shown on the drawings. The differential housing 13 is rotatively supported in the usual bearings 14 and is provided externally with the usual bevel gear 15. The bevel gear 15 in turn meshes with another bevel gear 16 mounted on the rear end of the usual drive shaft 17 which extends through a tubular housing 18 from the internal combustion engine (not shown) of the automobile 10. The connection of the drive shaft 17 to the internal combustion engine is generally known in the art and forms no part of the present invention, so further details of that connection will not be given in this specification.

Rear axle sections 19 extend from tubular projections 20 which extend from opposite sides of the differential housing 13. It is the tubular projections 20 which rotatively support the differential housing 13 in the bearings 14. The rear axle sections 19 are of irregular cross-section, and as shown on the drawings, may be made hexagonal in cross-section, but any other irregular cross-sectional shape may be used. The insides of the tubular projections 20 are round, see Fig. 5, so that the axle sections 19 are free to rotate within these tubular projections 20. The ends of the rear axle sections 19 extend beyond the ends of the tubular rear axle 11 and have the usual rear wheels 21 mounted thereon, as shown in Figs. 2 and 3.

The ends of the tubular projections 20 of the differential housing 13 outwardly of the bearings 14 are formed with external clutch teeth 22. Tubular sockets 23 are mounted on the outer ends of the tubular projections 20. The tubular sockets 23 are formed with internal clutch teeth 24 which mesh with the external teeth 23 of the tubular projections 20 for effecting the connection of the tubular sockets 23 with the tubular projections 20. As shown in Figs. 2 and 3, the outer ends of the tubular sockets 23 extend considerably beyond the outer ends of the tubular projections 20 of the differential housing 13. A set screw 25 is threadedly engaged through the side of the tubular sockets 23 and abut against the side of the tubular projections 20 to hold the sockets 23 against axial movement relative to the tubular projections 20.

Clutch members 26 are axially slidably mounted on the rear axle sections 19 adjacent each of the tubular sockets 23. The clutch members 26 are formed with concentric openings 27 conforming to the irregular cross-sectional shape of the rear axle sections 19. The ends of the clutch members 26 adjacent the tubular sockets 23 are formed with teeth 28 complementary to the internal clutch teeth 24 of the tubular sockets 23. When the clutch members 26 are moved into the ends of the tubular sockets 23, the teeth 28 of the gears will engage the internal teeth 24 of the tubular sockets 23 and lock the rear axle sections 19 to the tubular sockets 23 which in turn are mounted upon the ends of the tubular projections 20 of the differential housing 13. Thus, engaging the clutch members 26 into the tubular sockets 23 indirectly locks the rear axle sections 19 to the differential to rotate therewith as a unit to effectively drive both rear wheels when the differential housing is rotated. The engaged position of the clutch members 26 is shown in Fig. 3.

Figure 2:
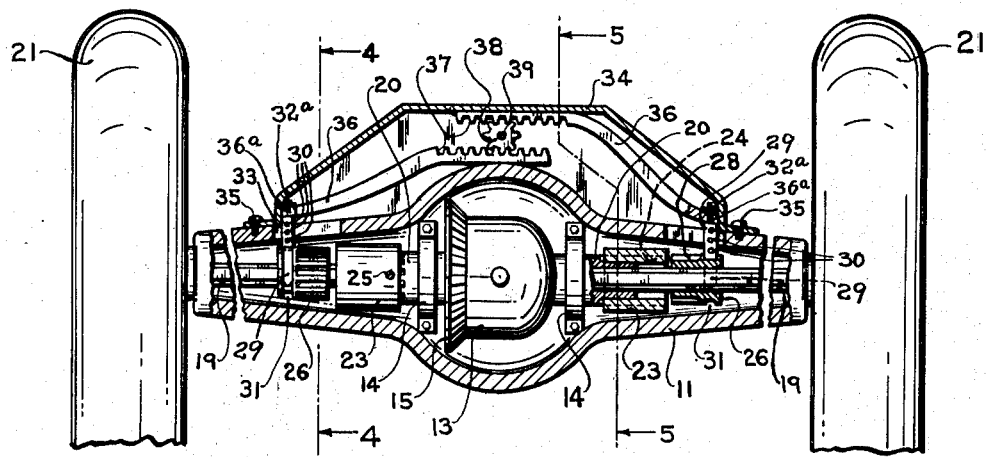
Fig. 2 is an enlarged longitudinal vertical sectional view taken on the line 2—2 of Fig. 1.
Figure 4:
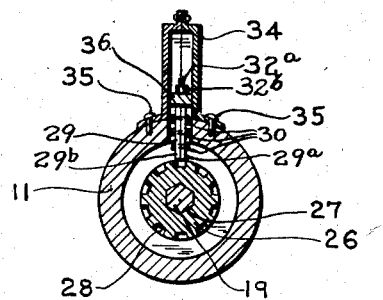
Fig. 4 is an enlarged transverse vertical sectional view taken on the line 4—4 of Fig. 2.

When the clutch members 26 are disengaged from the ends of the tubular sockets 23, as shown in Fig. 2, the rear axle sections 19 are free of any fixed connection with the differential housing 13 and the differential is free to operate as a normal differential in permitting the rear wheels 21 of the automobile to go around corners and the like.

Means is provided for sliding the clutch members 26 axially on the rear axle sections 19 for engaging and disengaging the clutch members 26 from the end portions of the tubular sockets 23. This sliding means comprises forks 29 having the free ends of their spaced side arms riding in the complementary grooves 31 formed in the clutch members 26 outwardly of their teeth 28. Each of the forks 29 is formed of opposed half sections 29$^a$ and 29$^b$, see Fig. 6, having adjacent stem portions secured together by three spaced bolts 30. The composite stem 32 of each of the forks 29, formed by securing together the stem portions of the half sections 29$^a$ and 29$^b$, are projected upwardly through elongated slots 33 formed in the top of the tubular rear axle 11. Mounted on the top of the tubular rear axle 11 over the slots 33, there is a housing 34 secured in position by removable bolts 35. Within the housing 34 there is a vertically spaced pair of rack bars 36 each of which has its outer end 36$^a$ formed with an opening for engagement of a reduced portion 32$^a$ formed on the top end of the composite stem 32 of its respective fork 29. The reduced portion 32$^a$ is threaded and is engaged by a complementary nut 32$^b$ adapted to hold the rack bar 36 securely in position on the composite stem 32. The free ends of the side arms of the forks 29 are curved to extend about more than half of the grooved portions of the clutch members 26. Thus, when the bolts 30 are tightened the forks will be loosely retained in position about the grooved portions of the grooves allowing free rotative movement of the clutch members 26 relative to the forks 29.

The lowermost rack bar 36 slides on the top of the tubular rear axle 11 and the uppermost rack bar 36 slides along the inner face of the top wall of the housing 34. The adjacent inner edges of the superimposed inner ends of the rack bars are formed with rack teeth 37 which mesh with a small pinion 38. The pinion 38 is fixedly mounted on the rear end of a shaft 39 which extends into the housing 34 through the front wall thereof.

Means is provided for manually rotating the shaft 39 in one direction or the other for moving the rack bars 36 in or out for correspondingly moving the forks 29 and in turn moving the clutch members 26 into and out of engagement with the ends of the tubular sockets 23. This rotating means is characterized by a small bevel gear 40 mounted upon the front end of the shaft 39 at a point just below the dashboard 41 of the automobile 10. The gear 40 in turn meshes with a second bevel gear 42 mounted on the bottom end of a vertical shaft 43. The top end of the vertical shaft 43 behind the dashboard 41 is formed with a bevel gear 44 which meshes with still another bevel gear 45 mounted on one end of a stud shaft 46 rotatively mounted through the dashboard 41. The front end of the stud shaft 46 at the front side of the dashboard is formed with a knob 47 which is adapted to be manually gripped and turned in one direction or the other for indirectly turning the gear 38 through the medium of the shafts 39 and 43 and the related bevel gears. The shafts 39 and 43 are of course supported in suitable bearings along their length, which have been omitted in the diagrammatic showing of Fig. 1.

The operation of the improved differential construction in accordance with the present invention is as follows:

For normal driving, the clutch members 26 will be out of mesh with the tubular sockets 23, as shown in Fig. 2, permitting the differential to function as a conventional differential and to allow the rear axle sections 19 to turn at different rates of speed as the automobile 10 moves around corners.

If one of the rear wheels 21 should become stuck in the mud or snow or otherwise lose its traction due to unfavorable driving conditions, the wheel 21 which is stuck will spin while the other wheel stands still due to the normal operation of the differential making it impossible to move the automobile under its own power. Without leaving his seat, the driver then turns the knob 47 in a direction to draw the rack bars 36 together through the medium of the small pinion 38, its shaft 39, the shaft 43 and the related bevel gears. This rotation will also draw the forks 29 together and slide the clutch members 26 axially on the rear axle sections 19 and engage the clutch members into the open ends of the tubular sockets 23 as shown in Fig. 3. Immediately, the teeth 28 of the clutch members 26 will mesh with the internal clutch teeth 24 of the tubular sockets 23 and indirectly lock each of the rear axle sections 19 to the differential housing 13 to rotate therewith as a unit. Then as the motor of the automobile 10 turns over the differential housing 13, the rear axle sections 19 will turn as a unit and the wheel which is stuck will no longer spin and the other wheel will grip the road surface and lift the stuck wheel out of its stuck position. When both wheels are again operating normally, the knob 47 is immediately turned in the opposite direction to withdraw the clutch members 26 from the tubular sockets 23, as it will be impossible to negotiate a turn with the clutch members 26 engaged in the tubular sockets 23.

In the modification of the invention illustrated in Figs. 8 and 9 of the drawings, the construction of the improved differential is similar to that previously described, except for the substitution of a hydraulic means for moving the clutch members 26 into and out of engagement with the tubular sockets 23.

In this hydraulic moving means the reduced top ends 32ª of the vertical stems 32′ of each of the forks 29 are secured to the extended ends of pistons 60 by bolts 60ª. The pistons 60 are slidable in cylinders 61 fixedly mounted on bosses 62 formed on the top of the tubular rear axle 11. A contraction spring 63 operates between a pin 64 mounted on each cylinder 61 and a hole 65 formed in the respective fork 29 for holding the piston 60 in a retracted position in which the clutch member 26 will be withdrawn from the end of the tubular socket 23. Each cylinder 61 is formed with a bleeder 61ª.

A twin-master cylinder 66 for hydraulic fluid is mounted beneath the floor of the automobile and includes adjacent and integral cylinders 66ª and 66ᵇ. Mounted within the cylinder 66ª there is a piston 67 urged into a raised inoperative position in the cylinder 66 by means of an expansion spring 68 which operates between the bottom face of the piston 67 and the bottom wall of the cylinder 66. An operating stem 69 is connected to the piston 67 and extends from the top of the cylinder 66 through the floor board of the automobile and is provided at its top end with a foot pedal 70 by which the stem 69 may be depressed for urging the piston 67 downwards in the cylinder 66 against the action of the spring 68 to force the hydraulic fluid to discharge from the bottom of the cylinder 66 through a pipe 71. At one point, the pipe 71 is connected with a T-connection 72 which leads to branch pipes 73 in turn connected with the interior of the cylinders 61. Thus hydraulic fluid which discharges from the master cylinder 66 upon depression of the foot pedal 70 will pass through the pipe 71, through the branch pipes 73 to the cylinders 61 and urge the pistons 60 outwards against the action of the contraction springs 63. This movement of the pistons 60 will move the forks 29 to slide the clutch members 26 axially on the rear axle sections 19 and engage the clutch members 26 into the ends of the tubular sockets 23.

When the foot pedal 70 is released, the spring 68 will urge the piston 67 up within the cylinder 66 relieving the pressure on the hydraulic fluid and release the pistons 60 to be drawn back into their cylinders 61 by the contraction springs 63 and disengage the clutch members 26 from the tubular sockets 23. During such movement the hydraulic fluid will discharge from the cylinders 61 through the branch pipes 73, through the pipe 71 and back into the master cylinder 66.

Means is provided in connection with the foot pedal 70 for releasably holding the piston 67 depressed within the cylinder 66 to hold the clutch members 26 engaged with the tubular sockets 23 until the foot pedal 70 is actually released. To accomplish this releasable holding, the bottom of the foot pedal 70 is formed with a lug 74 by which the foot pedal 70 is pivotally attached to the top end of the stem 69 by means of a pivot pin 75. The lug 74 is formed with an extension 76 which extends parallel to the stem 69 and which is formed along its top edge with ratchet teeth 77. The ratchet teeth 77 engage a complementary pawl-like edge 78 on the floor board for holding the stem 69 depressed. A leaf spring 79 is attached to the side of the stem 69 by several bolts 80 and bears against the adjacent side of the extension 76 for urging the extension into a position in which its ratchet teeth 77 will remain engaged with the complementary pawl-like edge 78. When pressure is applied to the free top edge of the foot pedal 70 the extension 76 will be pivoted against the action of the leaf spring 79 disengaging the ratchet teeth 77 from the pawl-like edge 78 and free the stem 69 and piston 67 to move upwards relative to the cylinder 66 under influence of the expansion spring 68.

The side of the cylinder 66 adjacent the bottom face of the piston 67, when the piston is in a raised position within the cylinder 66, is formed with a small opening closed by means of a screw plug 81 which is adapted to be removed to allow additional hydraulic fluid to be added to the system when required.

Metallic covers 82 are provided for covering the cylinders 61 and related parts to protect these parts from dirt and dust. The metallic covers 82 are releasably held in position by means of removable screws 83 and each is formed with a slot 84 through which the branch pipes 73 pass. The slots 84 extend to the bottom edges of the metallic covers to permit their removal without interference from the branch pipes 73.

A piston 90 is slidable within the other cylinder 66$^b$ of the twin-master cylinder 66 and is urged into a raised position within the cylinder 66$^b$ by an expansion spring 91. A pipe 92 leads from the bottom of the cylinder 66$^b$ for carrying hydraulic fluid compressed within the cylinder 66$^b$ to the conventional hydraulic brakes (not shown on the drawings) of the motor vehicle 10.

A stem 93 connected to the piston 90 is slidably projected from the top of the cylinder 66$^b$ and through the floor board of the vehicle and provided at its top end with a foot pedal 94 by which the piston 90 may be forced downwards within the cylinder 66$^b$ for applying the brakes when desired.

In other respects this form of the invention is similar to the form of the invention shown in Figs. 1 to 7 and like reference numerals identify like parts in each of the several views. It is further believed that the operation of the modified form of the invention will be apparent from the operation of the first form, and a further operation will not be given in connection with the modification.

On the drawings, the present invention is shown applied to an automobile having a two wheel rear drive; however, it is pointed out that this invention is equally applicable to trucks and buses and to vehicles having a four wheel drive; the showing on the drawing being by way of illustration only.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. Operating means for clutch members which are slidably splined on rotative axle sections and engageable with complementary clutch teeth formed in the ends of normally stationary rotatable members which surround the axle sections, comprising a cylinder fixedly mounted adjacent each of the clutch members, said cylinders having their axis extended in the direction in which the clutch members slide on the axle sections and having open ends facing in the direction in which the clutch members move to engage the clutch teeth, pistons slidably mounted in said cylinders and having outer ends extended from the open ends of said cylinders, a source of fluid under pressure including a foot operated pedal connected to said cylinders to extend said pistons when said pedal is depressed, resilient means retaining said pistons inoperatively within said cylinders, the clutch members remote from the ends of the projections having circular grooves, stems connected at one of their ends to the outer ends of said pistons, and forks on the other ends of said stems and engaging said grooves for sliding the clutch members to be engaged with and disengaged from the clutch teeth as the pistons move relative to the cylinders, said foot pedal having a lug on its bottom face, said source of fluid further including a master cylinder having a depressible stem projected from one end thereof, said lug being pivotally attached to the outer end of said depressible stem, and means on said lug for holding said foot pedal depressed a desired length of time to hold the clutch members in engagement with the clutch teeth, said holding means comprising an extension on said lug extended parallel to and in a spaced position along one side of said depressible stem, ratchet teeth on said extension, a fixed complementary pawl-like edge to be engaged by said ratchet teeth, and means pivoting said lug to engage the ratchet teeth with said pawl-like edge, said ratchet teeth and said pawl-like edge being faced so that said teeth will ride over said edge when said pedal is depressed and engage when said pedal is released for outward movement.

2. Operating means for clutch members which are slidably splined on rotative axle sections and engageable with complementary clutch teeth formed in the ends of normally stationary rotatable members which surround the axle sections, comprising a cylinder fixedly mounted adjacent each of the clutch members, said cylinders having their axis extended in the direction in which the clutch members slide on the axle sections and having open ends facing in the direction in which the clutch members move to engage the clutch teeth, pistons slidably mounted in said cylinders and having outer ends extended from the open ends of said cylinders, a source of fluid under pressure including a foot operated pedal connected to said cylinders to extend said pistons when said pedal is depressed, resilient means retaining said pistons inoperatively within said cylinders, the clutch members remote from the ends of the projections having circular grooves, stems connected at one of their ends to the outer ends of said pistons, and forks on the other ends of said stems and engaging said grooves for sliding the clutch members to be engaged with and disengaged from the clutch teeth as the pistons move relative to the cylinders, said foot pedal having a lug on its bottom face, said source of fluid further including a master cylinder having a depressible stem projected from one end thereof, said lug being pivotally attached to the outer end of said depressible stem, and means on said lug for holding said foot pedal depressed a desired length of time to hold the clutch members in engagement with the clutch teeth, said holding means comprising an extension on said lug extended parallel to and in a spaced position along one side of said depressible stem, ratchet teeth on said extension, a fixed complementary pawl-like edge to be engaged by said ratchet teeth, and means pivoting said lug to engage the ratchet teeth with said pawl-like edge, said ratchet teeth and said pawl-like edge being faced so that said teeth will ride over said edge when said pedal is depressed and engage when said pedal is released for outward movement, said pivoting means comprising a leaf spring operating between the adjacent faces of said extension and said depressible stem.

LOUIS FASULO.

REFERENCES CITED

The following references are of record in the file of this patent:

UNITED STATES PATENTS

| Number | Name | Date |
|---|---|---|
| 685,658 | White | Oct. 29, 1901 |
| 854,530 | Richley | May 21, 1907 |
| 992,104 | Bangs | May 9, 1911 |
| 1,026,498 | Delaunay et al. | May 14, 1912 |
| 1,032,261 | Wright et al. | July 9, 1912 |
| 1,125,079 | Dyer | Jan. 19, 1915 |
| 1,186,745 | Callaway | June 13, 1916 |
| 1,252,388 | Bickley | Jan. 8, 1918 |
| 1,271,319 | Hotsinpiller | July 2, 1918 |
| 1,450,804 | Gross | Apr. 3, 1923 |
| 1,458,877 | Dair | June 12, 1923 |
| 1,466,778 | Woods | Sept. 4, 1923 |
| 1,488,581 | Woodward | Apr. 1, 1924 |
| 1,751,074 | Cook | Mar. 18, 1930 |
| 1,835,412 | Livingwood | Dec. 8, 1931 |
| 1,886,323 | Wemp | Nov. 1, 1932 |
| 2,121,254 | Meinke | June 21, 1938 |
| 2,137,249 | Sanford | Nov. 22, 1938 |
| 2,159,137 | Doty | May 23, 1939 |
| 2,304,914 | Hibbett | Dec. 15, 1942 |
| 2,346,175 | Matson | Apr. 11, 1944 |
| 2,389,498 | Gates | Nov. 20, 1945 |

FOREIGN PATENTS

| Number | Country | Date |
|---|---|---|
| 780,866 | France | May 4, 1935 |